United States Patent [19]
Kronberg

[11] Patent Number: 5,157,465
[45] Date of Patent: Oct. 20, 1992

[54] UNIVERSAL FIBER-OPTIC C.I.E. COLORIMETER

[76] Inventor: James W. Kronberg, 353 Church Rd., Beech Island, S.C. 29841

[21] Appl. No.: 596,130

[22] Filed: Oct. 11, 1990

[51] Int. Cl.$^5$ .............................................. G01N 21/25
[52] U.S. Cl. .................................... 356/405; 250/226
[58] Field of Search ................... 356/402–405, 356/406–411, 326, 328; 250/227.23, 226; 350/96.24, 96.25; 385/115, 116

[56] References Cited

U.S. PATENT DOCUMENTS

| | | | |
|---|---|---|---|
| 3,504,980 | 4/1970 | Bentley et al. | |
| 3,531,208 | 9/1970 | Ward | 356/176 |
| 3,585,282 | 6/1971 | Allan | 350/96.25 |
| 3,885,879 | 5/1975 | Louder et al. | 356/326 |
| 3,993,899 | 11/1976 | Chapman | 250/227 |
| 3,998,551 | 12/1976 | Suga | 356/73 |
| 4,012,147 | 3/1977 | Walrafen | 356/98 |
| 4,125,329 | 11/1978 | French et al. | 356/405 |
| 4,165,180 | 8/1979 | Failes | 356/310 |
| 4,547,074 | 10/1985 | Hinoda et al. | 356/405 |
| 4,630,923 | 12/1986 | Tans et al. | 356/301 |
| 4,696,570 | 9/1987 | Joliot et al. | 356/319 |
| 4,778,988 | 10/1988 | Henderson | 250/226 |
| 4,909,633 | 3/1990 | Okui et al. | 356/405 |

Primary Examiner—F. L. Evans
Assistant Examiner—K. P. Hantis
Attorney, Agent, or Firm—Harold M. Dixon; William R. Moser; Richard E. Constant

[57] ABSTRACT

Apparatus for color measurements according to the C.I.E. system comprises a first fiber optic cable for receiving and linearizing light from a light source, a lens system for spectrally displaying the linearized light and focusing the light on one end of a trifurcated fiber optic assembly that integrates and separates the light according to the three C.I.E. tristimulus functions. The separated light is received by three photodiodes and electronically evaluated to determine the magnitude of the light corresponding to the tristimulus functions. The fiber optic assembly is made by forming, at one end, a bundle of optic fibers to match the contours of one of the tristimulus functions, encapsulating that bundle, adding a second bundle that, together with the first bundle, will match the contours of the first plus one other tristimulus function, encapsulating that second bundle, then adding a third bundle which together with the first and second bundles, has contours matching the sum of all three tristimulus functions. At the other end of the assembly the three bundles are separated and aligned with their respective photodiodes.

6 Claims, 4 Drawing Sheets

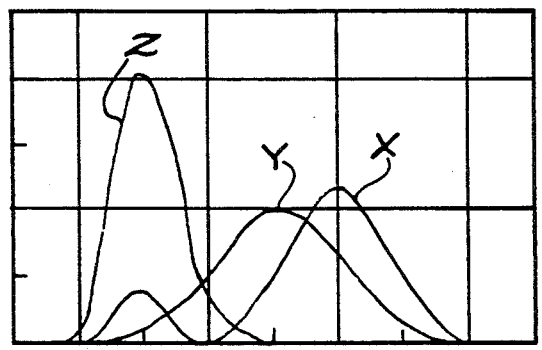
Fig_1.
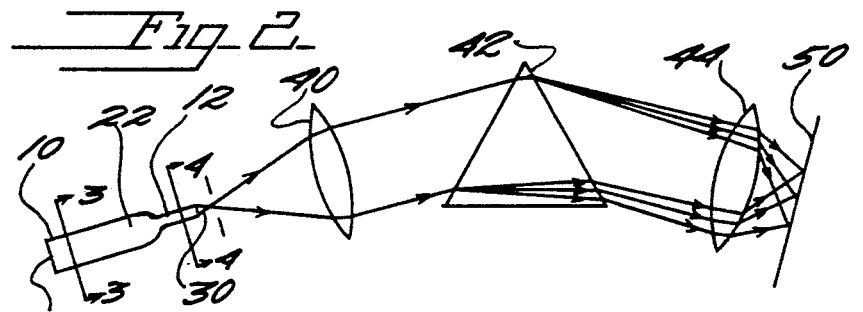
Fig_2.
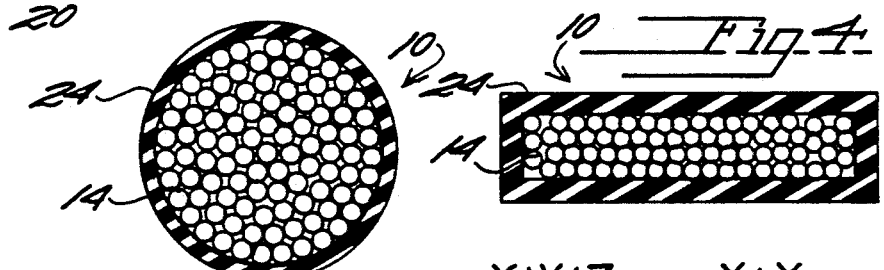
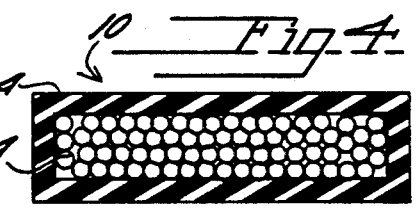
Fig_4.
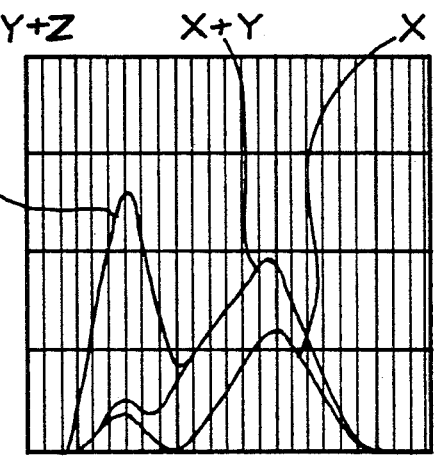
Fig_3.
Fig_5.

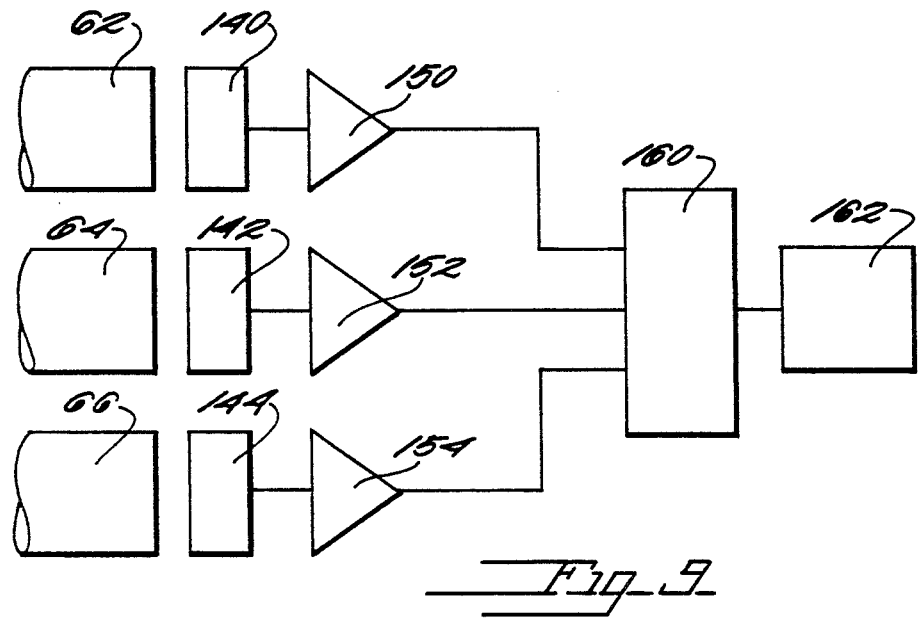
Fig_9
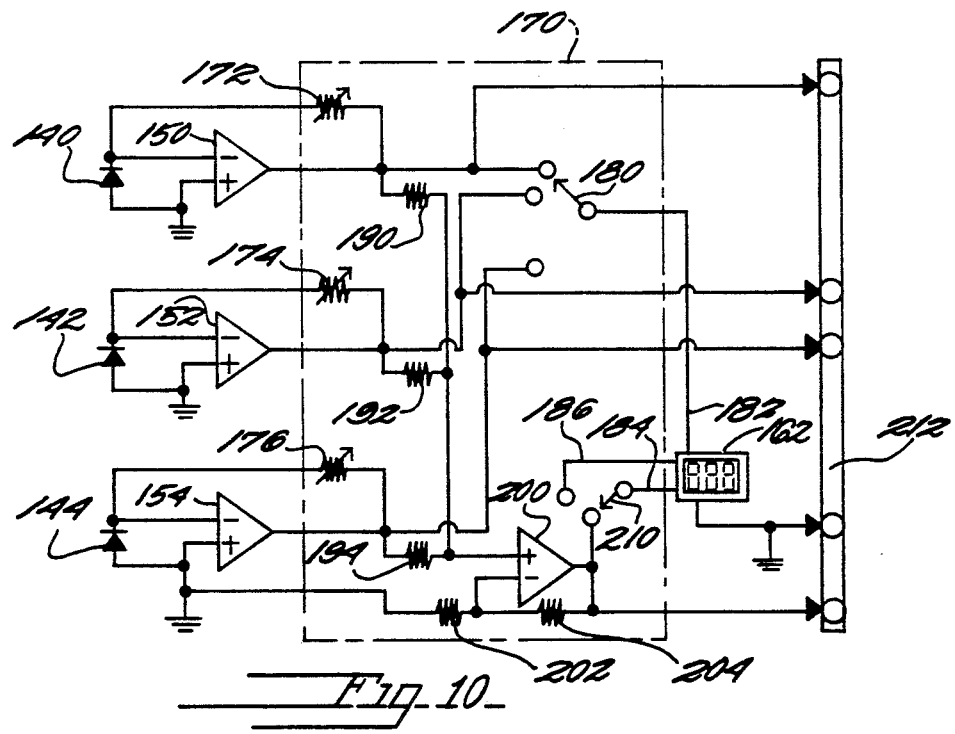
Fig_10

UNIVERSAL FIBER-OPTIC C.I.E. COLORIMETER

BACKGROUND OF THE INVENTION

1. Field of the Invention

The present invention relates to measuring color. More particularly the present invention is a colorimeter based on the standards for color established by the International Committee on Illumination. The United States Government has rights in this invention pursuant to Contract No. DE-AC09-89SR18035 between the U.S. Department of Energy and Westinghouse Savannah River Company.

2. Discussion of Background

Accurate color measurement, or colorimetry, is needed in many fields of industry, technology and art. For instance, accurate color matching is vital in assuring consistent batch-to-batch colors in making paints, dyed goods and metal alloys. Classical matching "by eye" is inaccurate and, therefore, inadequate. In determining the color of alloys used in jewelry making, for example, alloys of similar elemental composition may not be similar in color, while a good color match can often be obtained between quite different alloys; the same is true of paint pigments, dyes, or virtually any other product whose color is of any importance.

A mathematical system of colorimetry has been developed by the International Committee on Illumination (C.I.E.) and is widely used as a standard. However, instruments for measuring color according to this and other formal standards are prohibitively expensive for most applications.

The C.I.E. system begins by quantifying the human eye's response to color and luminosity. Three "tristimulus" functions X, Y and Z are defined to correspond, not to specific wavelengths of light, but to the approximate sensitivity of each of the three types of human retinal cone cells to varying wavelengths. Because sensitivity varies from one individual to another, and also from time to time in one individual, the X, Y and Z functions necessarily represent compromises defined for mathematical convenience. For a discussion of how the tristimulus functions are defined, one is referred to the publications of the Bureau Central de la C.I.E. in Paris, France.

To identify a specific color, as perceived by the average human eye, it is both necessary and sufficient to specify numeric values for X, Y and Z. These may then be transformed mathematically into the more familiar quantities of hue, brightness and saturation, if desired.

A moderately close approximation to X, Y or Z for a given light source can be obtained by passing light from the source through a red, green or blue filter whose transmission spectrum approximates X, Y, or Z, respectively, and then into a light-detecting cell whose response is nearly uniform across the visible spectrum. Filters may be dye, glass, liquid solutions, or a combination. However, no known combinations precisely match the X, Y and Z tristimulus functions. Hence, use of filters will give only an approximation to X, Y, and Z for a given source.

Much better accuracy is given by what is called a "template" colorimeter. In such a device, light from a source is dispersed according to wavelength, using a prism or diffraction grating, and projected onto templates which are cut out in the forms of the X, Y and Z tristimulus curves. The light passing through the templates then falls on light-detecting cells.

While the template method makes it possible to match the tristimulus curves to any desired degree of precision, the added optics and the need to change the templates and register their positions accurately make the device complex, cumbersome and expensive.

A more modern approach to "template" colorimetry could be implemented using a diode-array spectrophotometer with a built-in computer, such as the Hewlett-Packard 85. Light intensities at a large number of wavelengths could be measured, digitized, stored, and then multiplied by tabulated tristimulus values (such as those in section 9 of the Optical Society of America's *Handbook of Optics*) and summed to give the values of X, Y and Z. While well-suited to laboratory use, this approach is hardly practical for the occasional user, such as a small businessman or jeweler, because of cost and the need for custom programming to carry out this function. Color television technology could be used to give a similar result, but would be similarly expensive and would give a generally poorer match to the tristimulus curves, likely varying in quality depending on the source of the equipment.

To make accurate and universal C.I.E. color standardization an affordable, accurate reality, some measurement means will be needed which combines the high accuracy of the template and spectrophotometer methods with the low cost and simplicity of a filter-based device. No such means is presently available.

SUMMARY OF THE INVENTION

According to its major aspects, the present invention is a combined electronic and fiber-optic apparatus for measuring color according to the C.I.E. system. The system has two major portions. In one portion, a fiber optic bundle receiving light from a light source tapers to a thin cross section to transform the light entering the bundle to a linear source. A lens system displays the spectrum of the linear source of light. In the second portion, an optical fiber assembly composed of three bundles of optical fibers, one bundle for each C.I.E. tristimulus function, is positioned at the focal point of the displayed light. At one end of the assembly, the three bundles are configured and positioned to select the portions of the spectrum corresponding to the three tristimulus curves. At that end, the bundles are encapsulated together. At the other end, the bundles are separated, individually encapsulated and directed at photodetectors, such as silicon photocells, for converting the amount of light issuing from each bundle to a voltage output. Electrical circuitry in electrical connection with the photodetectors produces the three, digital tristimulus values from that output.

The optical fiber assembly is made by laying one end of a quantity of loose glass fibers into molds, one layer at a time, and binding each layer with a resin or other adhesive of lower refractive index before adding the next layer. The opposing ends of the fibers in each layer are separated into three bundles. The cross-section of each layer corresponds to one, two or all three of the tristimulus curves, and the joined ends are placed at the focal point of the lens system so the intensity of light in the three fiber bundles represents, for example, the three tristimulus functional values X, X+Y, and X+Y+Z.

A feature of the present invention is the trifurcated, encapsulated fiber optic assembly which receives the spectrally displayed light and integrates all three functions, the light in each portion defined by the corresponding layer configuration, to determine the tristimulus functions directly. The advantage of this feature is that the assembly does the integration of the three functions simultaneously, thus simplifying the process of color determination. Also, because the assembly is encapsulated, there are no moving parts that need to be registered with each other before each measurement. Finally, because of the use of a bundles of optical fibers, there is more flexibility in positioning of the photodetectors and associated electronics with respect to the separated bundles of the assembly.

It is another feature of the present invention that the first fiber optic cable transforms the light from the light source into a linear light source for spectral display. The advantage of this feature is that the light source does not need to be of a specific type or shape; it will be transformed from whatever shape it is in to a linear one.

It is a still other feature of the present invention that the apparatus implements the CIE system, an international system, so that the results of the color measurement by the apparatus can be used for processes and applications where this universal system is now applied.

These and other features and advantages will be apparent to those skilled in the art of colorimetry from a careful reading of the detailed description of a preferred embodiment in view of the accompanying drawings.

BRIEF DESCRIPTION OF THE DRAWINGS

In the drawings:

FIG. 1 is a graph of the three tristimulus curves of the International Committee on Illumination;

FIG. 2 is a diagram of the light path from source to object;

FIG. 3 is a cross sectional view of the first light bundle taken along lines 3—3 of FIG. 2;

FIG. 4 is a cross sectional view of the first fiber optic bundle taken along lines 4—4 of FIG. 2;

FIG. 5 is a graph of the three functions integrated by the second fiber optic assembly;

FIG. 9 is a schematic diagram of the interface of the three ends of the second fiber optic bundle with the circuitry of the present invention; and FIG. 10 is the circuitry for extracting the three digital values of the color detected by the present invention.

DETAILED DESCRIPTION OF A PREFERRED EMBODIMENT

Figure 6C:
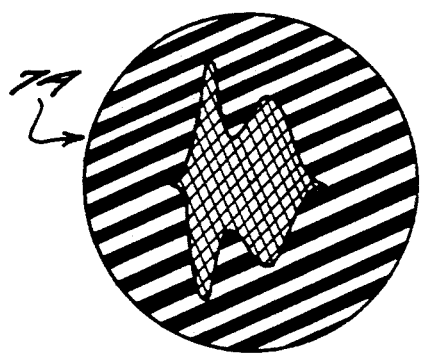
FIGS. 6a through 6d show cross sections of the molds for making the second fiber optical bundle, each mold used for making one of the three functions shown in FIG. 5.
Figure 6B:
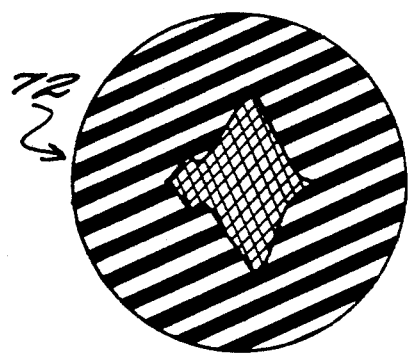
Figure 6A:
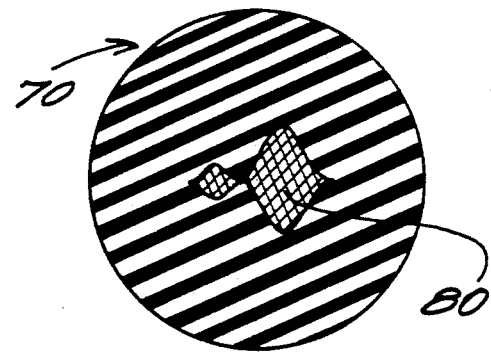
Figure 6D:
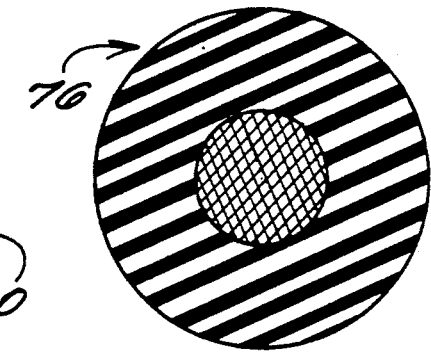

Referring now to FIG. 1, there are shown, in a graph of relative value versus wavelength, the three tristimulus function: X, Y and Z. These color representing functions are defined formally in the publications of the International Committee on Illumination. The X function has a double peak, one peak at the low wave length, blue end of the spectrum and one at the high wavelength, red end. The Y function peaks in the middle portion of the spectrum and the Z function peaks at the low wavelength, blue end of the spectrum.

Referring now to FIGS. 2, 3, and 4, which show the first of two portions of the present invention, there is a first fiber optic cable 10 which receives light from a source of light (not shown) and transforms that source to a nearly linear source in the following way. Cable 10, which may have any cross section at the end where the light from the source enters, is tapered over a portion of its length to have a thin cross section at 12. FIG. 3 shows a cross section of cable 10 taken along lines 3—3; FIG. 4 shows a cross section of cable 10 taken along lines 4—4. The cross section shown in FIG. 3 is illustrated as round which is a shape preferred for its light-gathering properties. However, the cross section of FIG. 4 is flat as a result of the tapering to spread the light in a thin line.

Cable 10 is preferably made by assembling a bundle of optical fibers 14 terminating at a first end in a common plane 20 where it is ground flat and polished and which receives light from the source of light (not shown). The center portion 22 of cable 10 is preferably flexible, of any convenient length, and encased within an opaque protective sleeve 24. Toward the opposite end, cable 10 is made rigid and is progressively flattened in cross section, terminating in a narrow rectangular surface at 30, as shown in FIG. 4, which forms the linear effective light source. Light taken in through surface 20 is re-emitted through surface 30 much as if it had passed through a narrow slit.

The light emitted from cable 10 at surface 30 is passed through a lens system for displaying the light in a spectrum; that is, it is refracted by optical elements 40, 42, and 44 to spread the light by wavelength into its colors and to focus the spectrum on surface 50 in a direction perpendicular to the line image. The lens system can have one or more focusing elements such as biconvex lenses, as with optical elements 40 and 44, and one or more dispersive elements such as prisms, as in optical element 42.

Optical elements 40 and 44 are preferably made from glass having low light dispersion or composed of separate elements to reduce chromatic aberration. Optical element 42 is a prism also made of high-dispersive glass. Light from surface 30 diverges until it reaches optical element 40, which bends the rays from each point on the surface to make them parallel. The rays then pass through optical element 42, which separates the wavelengths in a direction parallel to the short dimension of surface 30. Optical element 44 refocuses the light onto surface 50, forming its spectrum: a rectangular pattern consisting of an infinite number of images of surface 30, overlapping but spatially separated according to wavelength, as produced by a slit-type spectroscope.

Alternatively, the lens system can be composed of two planoconvex lenses bonded to a prism, using optical cement, to form a single assembly for simplicity, mechanical ruggedness and compactness, and a minimum of reflection from internal surfaces.

Figure 8:
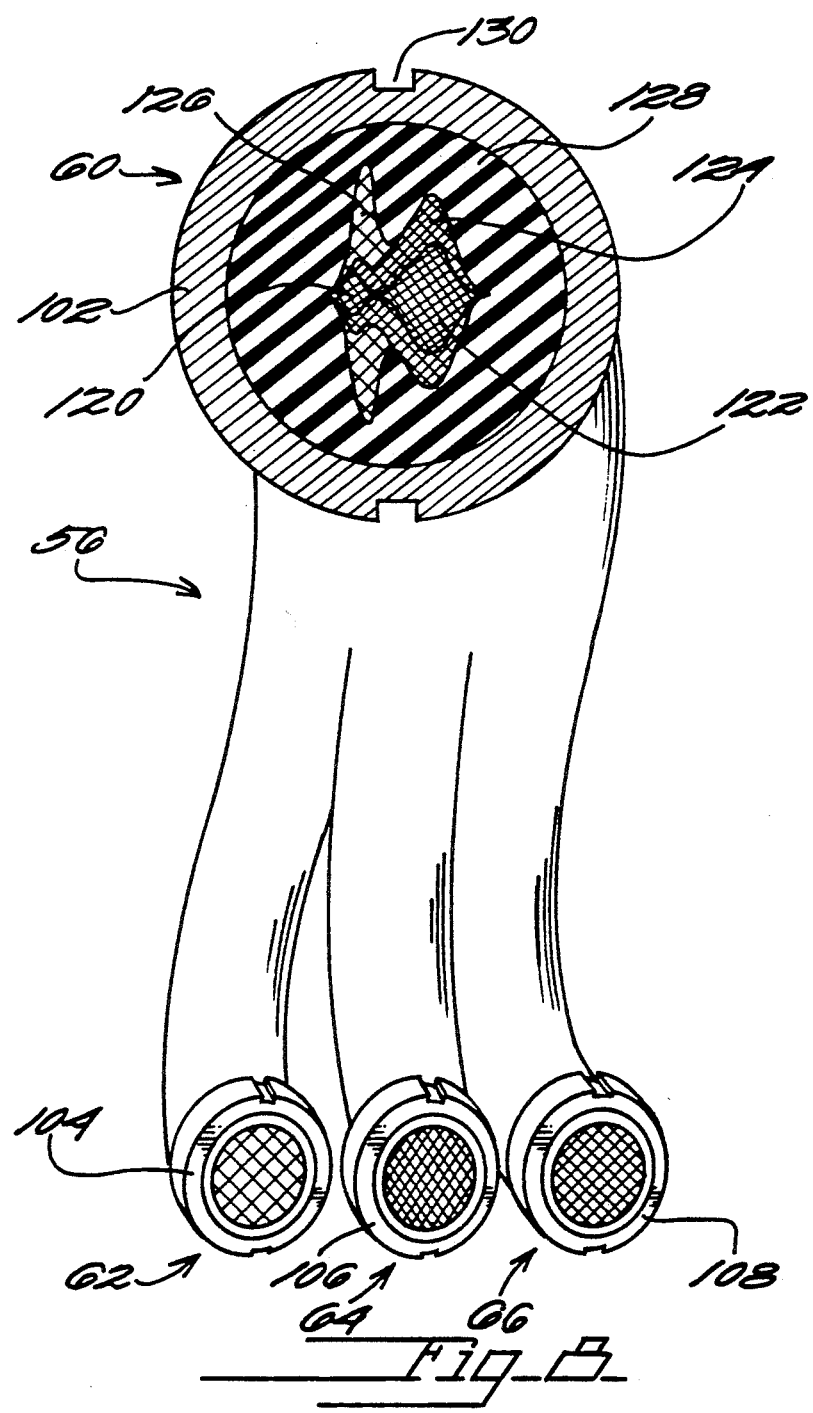
FIG. 8 shows the second fiber optic bundle.

The second portion of the present invention includes a trifurcated fiber optic assembly 56, as seen in FIG. 8, having a first end 60 which is positioned at the focus of the light from the lens system of the first portion of the present invention, in other words, first end 60 of fiber optic assembly 56 is surface 50.

In order to make fiber optic assembly 56, two new functions are defined: $X+Y$ and $X+Y+Z$. These, along with X are shown in FIG. 5. It will be clear that subtracting $X+Y$ from $X+Y+Z$ will yield the Z component; and that subtracting X from $X+Y$ will yield the Y component. The shapes of these three functions are embodied in molds 70, 72, and 74, each having internal contours matching one of the curves of the chosen functions. These molds are preferably made in symmetrical halves and sized to match the wavelength-dispersed image of surface 30 which is projected onto surface 50, which is first end 60. The outside shapes of molds 70, 72, and 74 are not critical. Molds should be made from non-stick material such as polyethylene or fluorocarbon. Alternatively, these molds may be replaced by thin-walled, split tubular clamps of the same form. One additional mold 76 is made, having a circular inner contour of the same area as mold 70 (corresponding to the color representing function X). If the clamps are to be used, three such clamps 76 will be needed.

Figure 7:
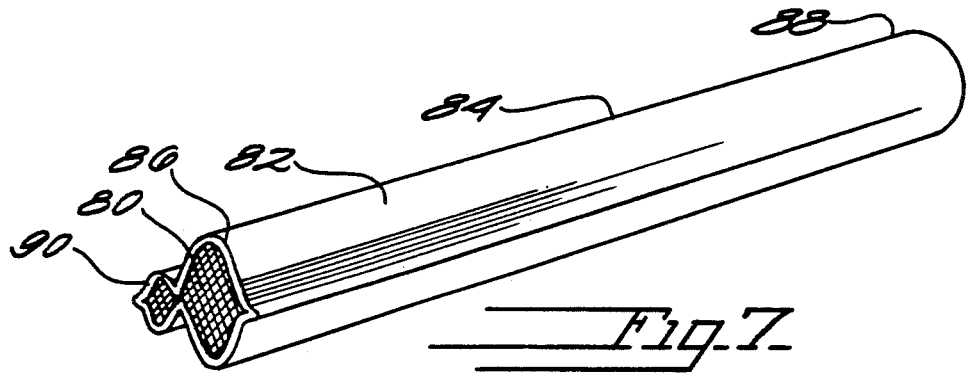
FIG. 7 shows one of the subassemblies of the second fiber optic bundle.

Loose optical fibers 80 are packed into mold 70, and an adhesive resin, having a lower refractive index than that of the fibers, is preferably added to bind them together. The opposite ends of the fibers are also gathered together, placed in mold 76, and similarly clamped together and preferably bound with resin. This creates a fiber bundle 82 (FIG. 7) having a flexible center portion 84 and rigid ends 86 and 88, one end configured to have the contour of mold 70 and the other, of mold 76 (not shown in FIG. 7). When the resin has cured, molds 70 and 76 are removed (or clamps may be left in place) and the fiber bundle may optionally be encased in an opaque, protective outer jacket 90.

The process is repeated with molds or clamps 72 and 74, each time positioning the previously formed bundle at the center of the new mold or clamp and adding fibers around it in the portion corresponding to the configuration of the incremental area under the functions and ultimately forming trifurcated bundle 56 whose smaller ends 62, 64 and 66 each contain fibers added during a different molding stage, while the larger first end 60 contains all such fibers. Because the molds represent successive sums of the tristimulus curves X, X+Y, X+Y+Z, each fiber group is configured and positioned at first end 60 to match one of the tristimulus functions and thus each of the opposing, smaller ends 62, 64, 66, contains fibers corresponding to a single, different tristimulus curve. Since the curves are normalized, each group consists of approximately the same number of fibers and all three of the smaller ends are equal in size; mold 76 may thus be used repeatedly.

When all resin has set, including additional resin as needed at first end 60 to fill in spaces between the three optic bundles, ends 60, 62, 64, and 66 are ground flat and polished. Metal or plastic ferrules, 102, 104, 106, and 108, respectively, are fitted (or molded) around first end 60 and each of smaller ends 62, 64, 66 to make them compatible with standard light-guide terminations, such as SMA connectors, for support and protection.

When complete, first end 60 of the optic assembly 56 shows five distinct regions 120, 122, 124, 126, and 128, which are to be compared to the functional curves in FIG. 5.

Regions 120 and 122 correspond to the two lobed portions of the X tristimulus curve, formed during the first molding step. Region 124 represents the Y portion superimposed on the X and formed during the second molding, and region 126, the Z portion superimposed on both the X and Y portions and formed during the third molding step.

Region 126 contains no fibers and consists of resin added during the final molding step to encase the bundles for support and protection only. This region is surrounded by ferrule 102, containing one or more alignment features such as slot 130, to ensure proper orientation in surface 50.

When first end 60 of fiber optic assembly 56 is illuminated by the linearized, focused and wavelength-dispersed light from the light source, only the light in the wavelength range of 400-700 nanometers (the visible range) will be received at first end 60. Wavelengths outside this range are of no interest for the purposes of the invention, since the tristimulus values for such wavelengths are so small as to be negligible.

In use, first end 60 of the guide is mounted at surface 50 to receive the light focused there; first end 60 is held in place by a fitting (not shown) which surrounds ferrule 102 and engages slot 130 for alignment. Light entering first end 60 is distributed among the regions 120, 122, 124, 126 and 128, based on the wavelength distribution of the focused light, and thus enters the three fiber optic bundles. These three bundles perform simultaneously the integration of the three tristimulus functions, X, Y and Z, and yield output in the form of the light emitted from each fiber bundle at the opposing second ends 62, 64, and 66, respectively.

Photodetectors, such as photodiodes 140, 142, and 144 are positioned at second ends 62, 64, and 66, respectively, (FIG. 9) to determine, along with the electrical circuitry to be described more fully below, the magnitude of the portion of the light spectrum passed by each bundle to its respective second end. Photodiodes 140, 142, 144, should be of a type whose sensitivity is uniform, or nearly so, across the full width of the visible spectrum. "Anti-reflective" coatings should be avoided, as these usually vary in effectiveness from one wavelength to another (giving photovoltaic cells their familiar bluish color) and thus make response nonuniform. Compensation for slight nonuniformities can be made by suitable adjustments in the profiles of molds 70, 72, and 74 and hence in the fiber distribution at first end 60. Response outside the 400-700 nanometer region is unimportant, since light of such wavelengths will not normally enter first end 60.

Photodiodes 140, 142, 144 are connected to amplifiers 150, 152, 154, respectively, which convert the current type diode outputs to voltages. These voltages are sent to a shared calibration and switching circuit 160 and thence to a digital meter 162, which displays digitized readings representing quantities X, Y and Z. Alternatively, this output could be sent to a computer or to other circuitry: for example, to circuits controlling the addition of tinting agents in a paint-mixing process for automatic color adjustment.

FIG. 10 shows a possible circuit arrangement for the photodiodes 140, 142, 144; amplifiers 150, 152, 154; calibration and switching circuit 160; and digital meter 162. All components within outline 170 make up the calibration and switching circuit 160.

Each photodiode 140, 142, 144 is wired to its respective operational amplifier 150, 152, 154, in "zero-voltage" configuration using feedback resistors 172, 174, and 176; this produces an amplifier output voltage which is a very linear function of light intensity. The output voltages, therefore, represent X, Y and Z. Resistors 172, 174, 176 are made adjustable so that X, Y and Z may be scaled to match any available light source, such as daylight, fluorescent or incandescent light. Voltages X, Y and Z are sent to the three input contacts of selector switch 180, whose output drives digital meter 162 through input terminal 182. Typically, all three voltages would be set to 100%, using a pure white reflector or color card, before each set of color measurements began.

In some colorimeteric applications, the full color specification by X, Y and Z is of less interest than the "chromaticity", or color specification by hue and saturation without regard to brightness. Chromaticity is specified by two variables x and y:

$$x = \frac{X}{X+Y+Z} \qquad y = \frac{Y}{X+Y+Z}$$

To facilitate such applications, voltages X, Y and Z are averaged by resistors 190, 192, 194; the resulting voltage appears at the non-inverting input of operational amplifier 200. Resistors 202 and 204 are chosen and connected so that amplifier 200 multiplies this voltage by three; its output therefore represents $X+Y+Z$. A ratiometric meter, such as the Datel DM-4200, is used as digital meter 162. Such a meter, in addition to its usual input terminal 182, has a reference input 184 and an internal voltage source made available at terminal 186. Switch 210 selects either the internal or an external reference voltage, so that the quantity displayed may be either $V_{IN}/V_{REF}$ or $V_{IN}/V_{EXT}$. In this case $V_{EXT}$ is $X+Y+Z$ and thus, with switch 210 turned to the X or Y position, the displayed quantity is x or y, respectively. (The Z position of switch 210 is redundant in this application.)

Voltages X, Y and Z and $X+Y+Z$, along with signal ground, are made available at connector 212 for optional use with external circuitry: for example, in process control.

Typical values and part numbers for the electronic parts used in the invention are:

Photodiodes 140, 142, 144—Motorola MRD721 or equivalent, silicon PIN photodiode.

Amplifiers 150, 152, 154, 200—one LM 324 I.C. (quad pack).

Meter 162—Datel DM 4200; set up to display "100.00" at 1.0000 volt input.

Resistors 172, 174, 176—100K potentiometers; multiturn types preferred.

Switch 180—any three-position, single-pole rotary type.

Resistors 190, 192, 194—47K, 1% tolerance.

Resistor 202—any value 10K–100K 1% tolerance.

Resistor 204—twice the value of resistor 202.

Note—resistors 190, 192, 194, 202, 204 are preferably a matched thick-film array, Allen-Bradley 314B473 (7×47K) or equivalent. Resistors 190, 192, 194, 202 are each one array element; resistor 204 is two elements in series.

Switch 210—any rotary, toggle or slide type SPDT switch.

Connector 212—any convenient type.

Amplifiers 150, 152, 154 and amplifier 200 are powered by a +12-volt D.C. supply, good for 50 milliamperes or more. The DM-4200 requires a +5 V D.C. supply good for 250 milliamperes or more. Both supply voltages are referenced to ground. If the amplifiers are LM-324 types, no negative supply is needed.

It will be apparent to those skilled in the art that various modifications and additions can be made to the above described detailed description of a preferred embodiment without departing from the spirit and scope of the present invention. In particular, the color representing functions could be other than the C.I.E. tristimulus functions and there could be other than three functions. Also, the choice of X, X+Y, and X+Y+Z is somewhat arbitrary in that (for instance) Y, Y+Z, and Y+Z+X would be equivalent. Similarly, in the lens system and electronic circuitry, other, equivalent systems could be developed. Nevertheless, the scope of the invention is to be defined by the appended claims.

What is claimed is:

1. An apparatus for measuring the color of a source of light, said apparatus comprising:
   means for displaying light from said source of light in a spectrum, said displaying means having
   means for transforming said light source into a linear light source, and
   lens means for displaying said linear source according to wavelength;
   an optical fiber assembly having
   means for encasing bundles of optical fibers, said encasing means having a first end and a plurality of second ends, and
   a plurality of bundles of optical fibers arranged within said encasing means so that each bundle of said plurality of bundles is configured and positioned at said first end to receive a portion of said spectrum of said light and separated at said second ends so that said portion of said spectrum received by said each bundle is isolated from any other portion, each of said bundles terminating at one of said second ends, said portions formed to correspond to at least one tristimulus function, said plurality of bundles integrating said light according to said at least one tristimulus function; and
   means for determining the magnitudes of each of said integrated tristimulus functions, said determining means in spaced relation to said second ends of said encasing means.

2. The apparatus as recited in claim 1, wherein said determining means further comprises:
   a plurality of photodetectors, each photodetector producing an output; and
   electrical circuitry in electrical connection with said plurality of photodetectors and responsive to said output, said electrical circuitry converting said output to a digital signal.

3. The assembly as recited in claim 2, wherein a first bundle of said plurality of bundles receives a first portion of said spectrum corresponding to any one tristimulus function, a second bundle receives a second portion of said spectrum corresponding to a second tristimulus function, and a third bundle receives a third portion of said spectrum corresponding to a third tristimulus function.

4. The assembly as recited in claim 1, wherein a first bundle of said plurality of bundles receives a first portion of said spectrum corresponding to any one tristimulus function, a second bundle receives a second portion of said spectrum corresponding to a second tristimulus function, and a third bundle receives a third portion of said spectrum corresponding to a third tristimulus function.

5. The apparatus as recited in claim 1, wherein said transforming means is a fiber optic bundle having a first end and a second end, said second end having a thin cross section, said first end receiving light from said light source.

6. The apparatus as recited in claim 1, wherein said transforming means is a fiber optic bundle having a first end and a second end, said bundle tapering from said first end to said second end, said second end having a thin cross section, said first end having a generally round cross section.

* * * * *